(No Model.) 4 Sheets—Sheet 2.
J. W. LATTIG.
ELECTRIC SIGNALING APPARATUS AND SYSTEM.
No. 496,786. Patented May 2, 1893.
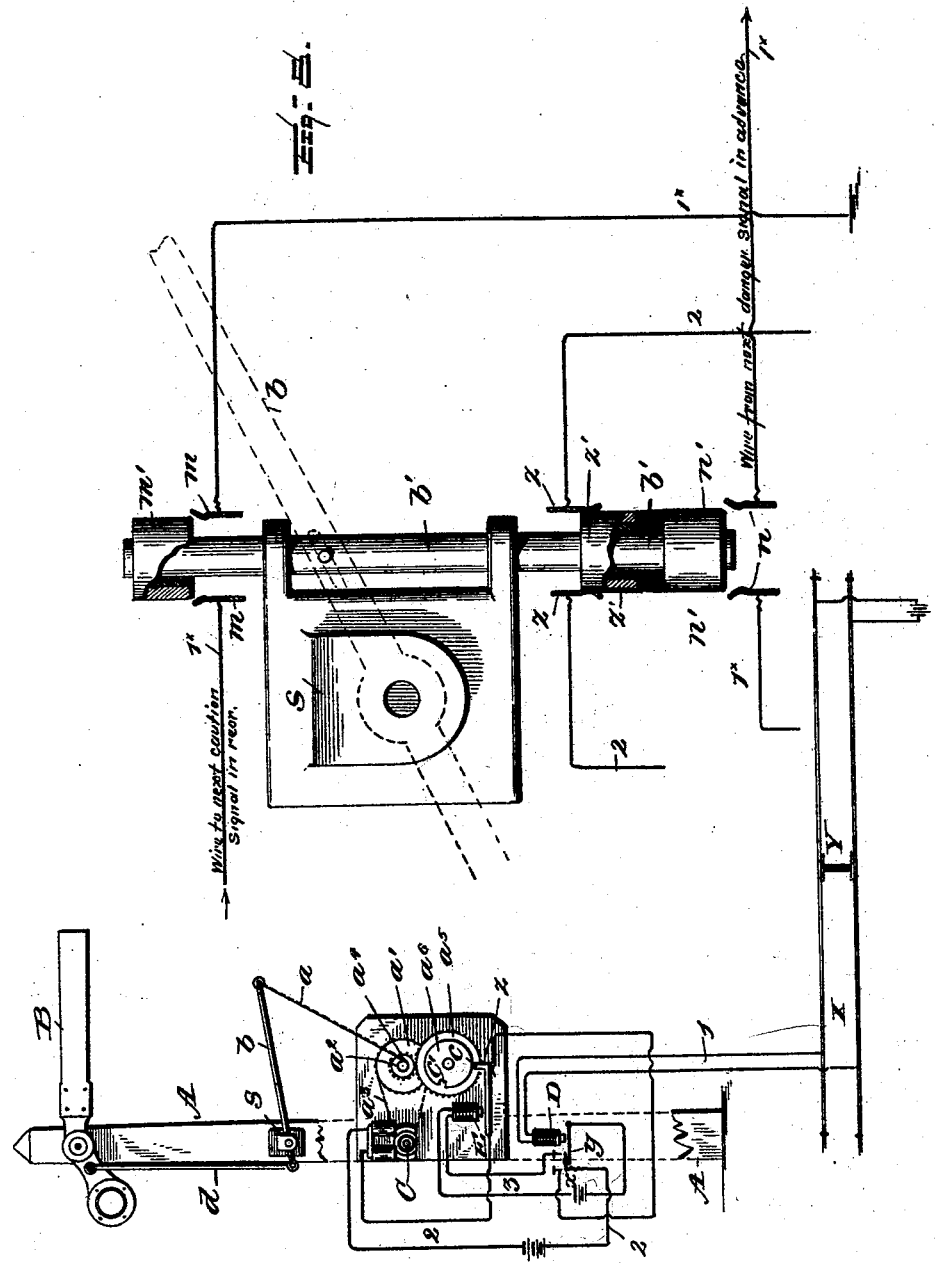
Witnesses
L. C. Hills.
Ewell A. Dick
Inventor
Jacob William Lattig
by Marcellus Bailey
his Attorney

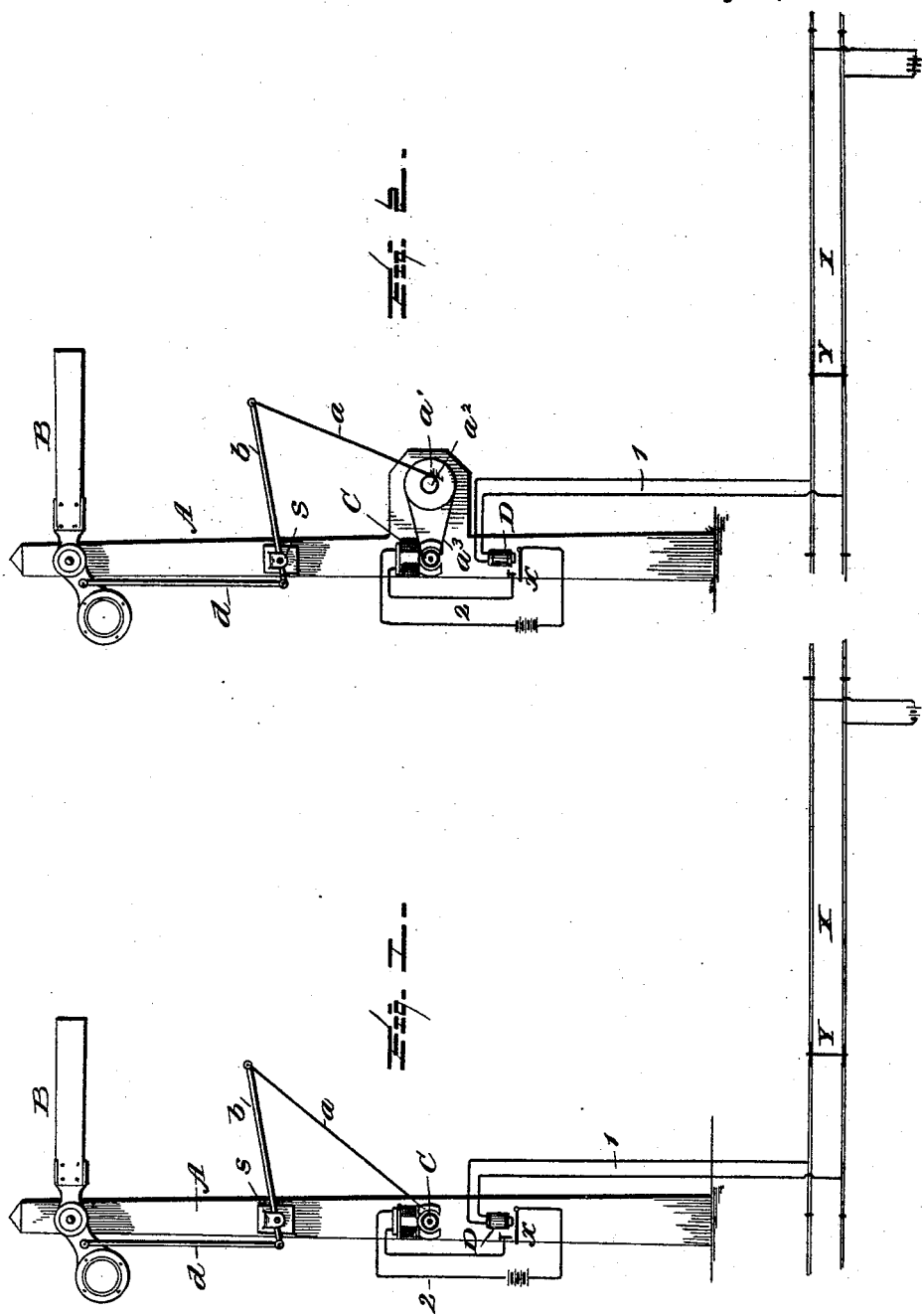

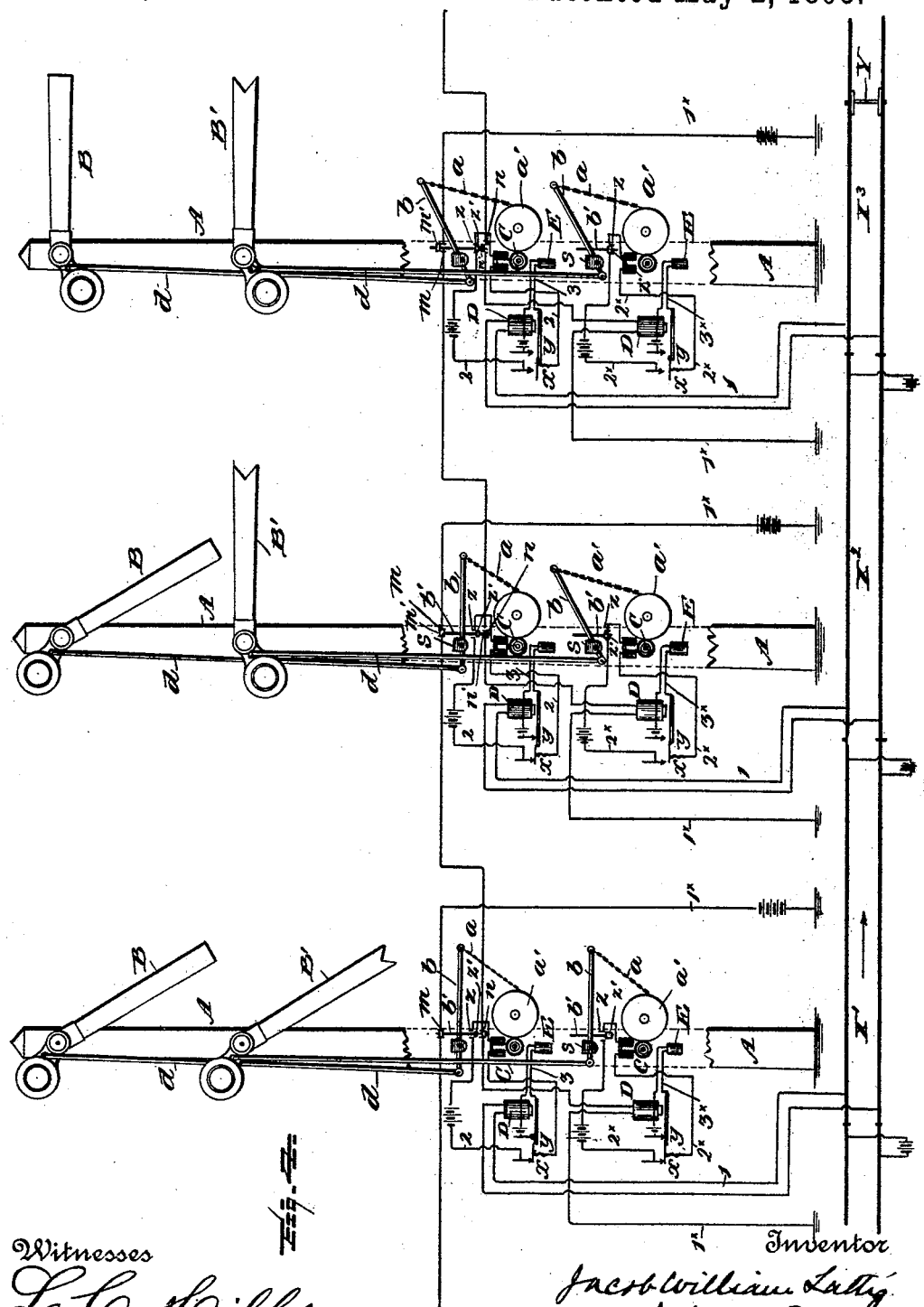

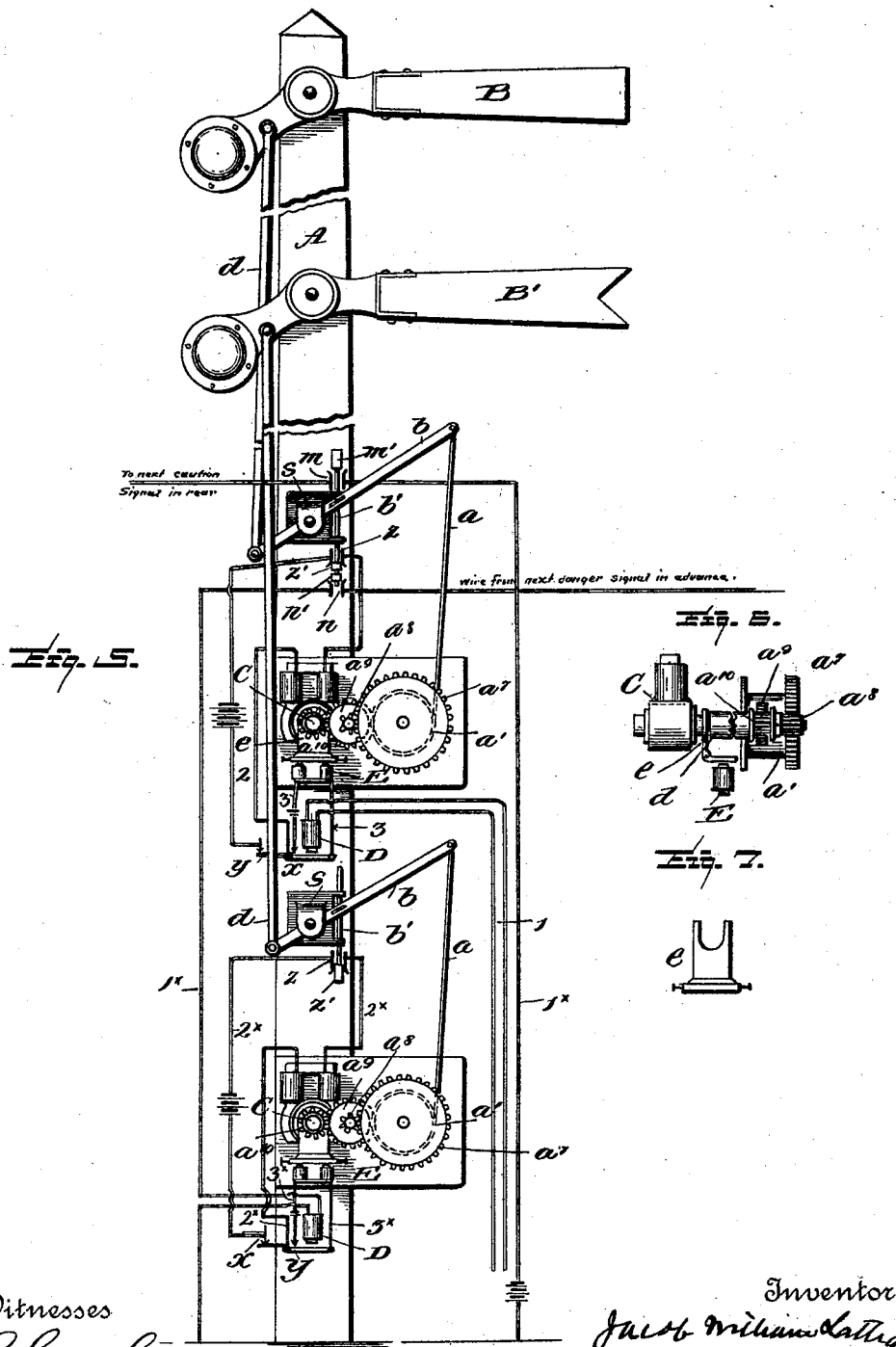

UNITED STATES PATENT OFFICE.

JACOB WILLIAM LATTIG, OF EASTON, PENNSYLVANIA.

ELECTRIC SIGNALING APPARATUS AND SYSTEM.

SPECIFICATION forming part of Letters Patent No. 496,786, dated May 2, 1893.

Application filed December 27, 1892. Serial No. 456,380. (No model.)

*To all whom it may concern:*

Be it known that I, JACOB WILLIAM LATTIG, of Easton, in the State of Pennsylvania, have invented certain new and useful Improvements in Electric Signaling Apparatus and Systems, of which the following is a specification.

The signal operating apparatus which I have devised contemplates the employment of an electric motor for actuating the signal operating mechanism in order to move the signal to safety. The circuit through which current is supplied to the motor includes contacts which are controlled by a relay included in a constantly closed track circuit—the arrangement being such that the contacts in the motor circuit will be opened whenever a train reaches the track section forming part of the track circuit including that relay, in which event the current will be short circuited through the wheels of the train, the track relay will be de-energized, the contacts in the motor circuit will be opened, the motor will thus be de-energized and the signal will be free to rise to danger which it does by reason of its counter weight, the motor armature revolving backward as a mere idler. As soon as the train passes beyond the section, the track relay is again energized, and closes the motor circuit, and the motor is at once put into action to lower the signal, which it does until the latter reaches safety position, at which time the motor will be stalled and incapable of further moving the signal (because the latter at that point brings up against the usual stop) but will still act to hold the signal in safety position.

The plan thus far described contemplates a motor circuit which is closed at all times except when a train is on the track section appropriate to the signal. This would not be objectionable if the motor were supplied with current from a dynamo, which could be used to supply a large number of motors in a signal system. But in case the current is supplied from batteries, in which event each motor would have its own battery, then in order to prevent useless expenditure of energy and consequent exhaustion of the battery to which it would be more particularly liable if, as I prefer, it should be of low internal resistance, I prefer to add to the parts already described means for breaking the motor circuit as soon as the motor has done its work, and a detent for holding the signal operating mechanism in the safety position to which it has been brought by the motor. To this end I place in the motor circuit a second set of contacts, which are controlled, through a suitable intermediary, by or from the signal operating mechanism in such manner that they shall be opened whenever that mechanism reaches safety position; and I superimpose upon the system of circuits already described a third or locking and releasing circuit containing contacts controlled by the relay of the track circuit, so that the said locking and releasing circuit shall be closed at all times except when a train is on the track section, and the track relay consequently is short circuited, and including an electro-magnetically controlled detent, which, called into operation by the locking and releasing circuit when the latter is closed, engages and locks the signal operating mechanism after it has been brought to safety position, and so holds it until the next opening of the locking and releasing circuit due to the entrance of another train upon the block or track section.

In approved systems of automatic block signaling, it is usual to provide each block with two signals, a danger signal and a caution signal—the danger signal for example going to safety when and as soon as the train passes the block appropriate to that signal, but the corresponding caution signal remaining at danger and not going to safety until after the train has passed the next block beyond. This provision can be readily made under my invention, by providing in addition to the danger signal and system of circuits therefor as above described, a second or caution signal with a second system of circuits similar to those already described for the danger signal, save that in the caution signal system the primary controlling circuit corresponding to the track circuit of the danger signal system, is a grounded circuit having no connection with the track, and further contains two sets of contacts controlled, the one by the danger signal operating mechanism of that block to which the caution signal pertains, and the other by the operating mechanism of the danger signal pertaining to the next block beyond, the arrangement being such that both sets of contacts are closed only when the danger signal mechanism appropriate to each set is in safety position. Thus the caution signal can be brought to safety only after the danger signal of the next block beyond has been brought to safety, which can be only after the train has passed that block.

In the accompanying drawings, to which I will now refer for a more complete understanding of my improvements and the manner in which they may be carried into practical effect—Figure 1 is a side elevation of a signal post and signal appliances thereon organized and arranged in accordance with my invention with a diagrammatic representation of a system of circuits applicable thereto. Fig. 2 is a like view of a modification. Fig. 3 is a like view of a still further modification, with a locking and releasing circuit, and an electrically controlled detent superadded to the appliances represented in the preceding figures. Fig. 4 is a diagrammatic representation of an automatic block system of danger and caution signals and circuits therefor in accordance with my invention. Fig. 5 is an enlarged view of one of the signal posts and signal appliances and circuits therefor used in the system represented in Fig. 4. Figs. 6, 7 and 8 are details of the appliances represented in Fig. 5.

In Fig. 1, A is a signal pole carrying the usual pivoted counterweighted semaphore blade B.

C is an electric motor mounted on the side of the pole, and having on its armature shaft a drum to which is secured a cord or other suitable pliable connection $a$, having its other end fast to the extremity of the longer arm of a lever $b$, pivoted to a supporting bracket $s$, fast to the side of the pole, and having its shorter arm joined by the vertical connecting rod $d$ to the counterweighted side of the pivoted semaphore blade. When the motor is inactive, the signal rises to and stands at danger. When the motor is energized the rotation of its armature coils the cord $a$ around the drum on the armature shaft, thus pulling down the longer arm of the lever $b$, and consequently forcing up the connecting rod $d$—the result being that the semaphore blade will be caused to drop, until its counterweight in rising brings up against the signal pole, which will not be until the signal is at safety. When this takes place the motor will be stalled and incapable of further motion, but it will still act to hold the blade in safety position, until the supply of current is cut off from it, at which time the counterweight will act to pull the signal to danger, the cord $a$ at this time being drawn on by the lever $b$ so as to cause it to revolve the armature backward as an idler.

The circuit arrangements are as follows: The track circuit 1 is a constantly closed circuit; it includes the relay D and is completed through the rails of the insulated track section or block X. The motor circuit 2 includes the motor C, and a pair of contacts $x$ controlled by the armature of track relay D, the arrangement being such that so long as the relay is energized (which it will be so long as the block or section X is clear) the contact $x$ will be closed, and consequently the motor will be energized and will operate to move the signal to safety and hold it there. As soon however as a train—typified at Y—enters the block X, the track circuit will be completed through the path of lower resistance afforded by the car wheels and axles. The relay D consequently will be cut out or short circuited, its armature will drop, thus opening the contacts $x$ and breaking the motor circuit, and the motor will at once become inactive and allow the signal to rise to danger, this condition of affairs continuing until the train has passed beyond the block, at which time the normal condition of the circuits will be restored, and the signal will go to safety.

The arrangement of appliances and circuits in Fig. 2, is the same as in Fig. 1, save that, for the purpose of gaining in power (with of course a proportionate decrease of speed) the cord $a$ by which the lever $b$ is pulled down is attached to a drum $a'$ fast on the axle of a pulley $a^2$, belted at $a^3$ to the armature shaft of the motor.

Fig. 3 contains the same arrangement as in Fig. 2, (the pulley $a^2$ being a sprocket wheel and the belt $a^3$ being a sprocket chain engaging a sprocket wheel on the motor armature shaft,) and like reference letters and numerals indicate like parts in the two figures. I have added however to the system of circuits and appliances in this figure, a third circuit for controlling means for locking and releasing the signal operating mechanism, and means for breaking the motor circuit after the motor has brought the signal to safety.

The locking and releasing circuit is indicated at 3. It has in it contacts $y$ which are controlled by the armature lever of the track relay D, and open and close simultaneously with the contacts $x$ of the motor circuit—being of course insulated from the latter contacts; and it further includes a relay E, the movement of the armature lever of which closes and opens a second pair of contacts $z$ in the motor circuit 2. This armature lever also carries a prong or detent $c$ which is intended to enter or engage at the proper time a notch $c'$ in the periphery of a disk $a^6$ fast to a spur wheel $a^5$ mounted in suitable bearings and engaging and driven by a pinion $a^4$ fast on the same axle with the drum $a'$. These parts are so arranged and proportioned that when the notch $c'$ comes opposite to the detent $c$, the motor will have pulled down the signal to safety, and the arrangement of the contacts $z$ in the motor circuit is such that the upward movement of the armature lever to carry the detent into the notch (a movement permitted by the signal operating mechanism only when the signal has been lowered to safety) will suffice to separate the contacts $z$ and thus to open the motor circuit at that point.

In the position of parts shown in Fig. 3, a train Y is supposed to be on the block X. This being the case, the track relay will be cut out; the contacts $x$ and $y$ consequently will be separated, thus breaking the circuits 2 and 3; the armature lever of the de-energized locking and releasing relay E will have dropped, releasing the signal operating mechanism from the detent, but closing the second break in the motor circuit at $z$, and the signal by its counterweight will have been brought to danger. This is the position of parts represented in the figure. As soon however as the train passes beyond the block, the track circuit is restored through the track relay; the motor and locking and releasing circuits 2, 3 are closed at the points $x$ and $y$ (the other break $z$ in the motor circuit having previously been closed as above explained); the motor acts through the signal operating mechanism to lower the signal to safety. The now energized locking and releasing relay magnet E attracts its armature lever, but can draw it up only as far as permitted by the detent which is arrested by the unbroken portion of the periphery of the revolving disk $a^6$ against which it bears—this slight movement of the armature lever being insufficient to separate the contacts $z$ (the back one of which is a spring contact adapted to follow the other a certain distance); and this condition of affairs continues until the signal is at safety. By this time the disk $a^6$ will have revolved far enough to bring the notch $c'$ opposite the detent $c$. Consequently the attracted armature of the relay magnet E is free to rise, and in so doing it simultaneously engages the detent $c$ with the disk $a^6$, thus locking the signal at safety, and separates the motor circuit contacts at $z$, thus breaking the motor circuit, which continues open until the locking and releasing relay magnet E is de-energized. The locking and releasing circuit however continues closed, for the purpose of holding the armature of the relay E up, and will so remain until the track relay D is again de-energized. Thus of the two sets of contacts in the motor circuit the one $x$ is directly controlled by the track relay. The other $z$ however is controlled by or from some moving part of the signal operating mechanism, which will not permit any movement of separation until the signal has reached safety position, at which time their separation is permitted, thus saving expenditure of battery energy further than that required to cause the motor to move the signal from danger to safety.

In Fig. 4 I have represented the general system of appliances represented in Fig. 3 extended to an automatic block system embracing danger and caution signals for each block—the arrangement being such that the danger signal (like the signal in the preceding figures) is automatically brought to danger when the train enters the block appropriate to that signal and to safety when the train quits that block, but the corresponding caution signal, while brought to danger by the entrance of the train on the block, is not restored to safety until the train passes beyond the next block in advance. To attain this result I have duplicated for the caution signal the same general system of circuits and appliances as that employed in Fig. 3 for the danger signal, with such modification in the initial or primary caution signal circuit (corresponding to circuit 1 of the danger signal system) as required in order to adapt the caution signal to its somewhat different use. I have also modified in some respects the arrangement and structural details of some of the mechanical and electro-mechanical appliances in the system, although in principle and in general mode of operation they remain in substance the same as those already described. In order that these differences may be more clearly understood I will first describe by reference to Figs. 5 to 8 the construction and arrangement of the parts on one of the signal poles in Fig. 4.

Fig. 5 represents the pole in side elevation. Similar reference letters and numerals indicate like parts in all the Figs. 1 to 8 inclusive of the drawings. There are two signals on the pole, the upper one B a danger signal, the lower one B' a caution signal. There are two distinct sets of signal operating mechanism on the pole, these two sets so far as concerns their mechanical features being exactly alike, so that a description of one will answer for both. The upper set is connected to and operates the danger signal. The lower set is connected to and operates the caution signal.

The danger signal system of circuits 1, 2, 3, is the same as previously described, save that the contacts $z$ of the motor circuit are somewhat differently located—this however being a mere difference of detail.

The drum $a'$ on which the signal lowering cord $a$ is wound is secured on the axle of a spur wheel $a^7$ connected by gearing $a^8$, $a^9$, $a^{10}$, with the armature shaft of the motor. This system of gearing is shown in front elevation in Fig. 6. The pinion $a^{10}$ is loose on the armature shaft, and at the proper time is connected thereto by the movable clutch member $d$, which has teeth to engage corresponding teeth on the contiguous face of the hub of pinion $a^{10}$. The movable clutch member $d$ has a longitudinal spline and groove connection with the armature shaft so that while rotating with the shaft it can slide lengthwise of the latter, to and from the pinion $a^{10}$. The movable member $d$ is pressed up into engagement with the pinion $a^{10}$ by a vertical shifting yoke $e$ (shown in front elevation in Fig. 7) which is attached to the pivoted horizontal armature lever of the locking and releasing magnet E and projects up so as to straddle the armature shaft of the motor and to bear against the outer end of the movable clutch member $d$. When the locking and releasing magnet E is energized the movement of its armature consequent thereon will move the shifting yoke $e$ in a direction to cause the clutch member $d$ to engage the pinion $a^{10}$ thus coupling the latter to the motor armature shaft, and consequently causing the signal operating mechanism to lower the signal to safety. Whenever after this the locking and releasing magnet E is de-energized and its armature is free to fall back, the pinion $a^{10}$ will be uncoupled from the armature shaft, and the signal by its counterweight will be placed at danger. The weight of the counterweight is such that while sufficient to overcome the friction of the gears from $a^{10}$ to $a^7$ inclusive, it will not be sufficient to overcome that friction plus the inertia of the motor armature; and consequently so long as the armature shaft is coupled to the pinion $a^{10}$, after the signal has been brought to safety, the signal operating mechanism will be held in safety position, the clutch member $d$ constituting in effect the electro-magnetically controlled detent (corresponding in function to the detent $c$ of Fig. 3) by which this result is secured. The break in the motor circuit at $z$ is controlled by two spring contacts $z$ and a conducting sleeve $z'$ mounted on but insulated from a vertical rod $b'$ supported and adapted to slide in bearings on the bracket support $s$ and connected to and actuated by the lever $b$ as shown more plainly in Fig. 8—the arrangement being such that by the time the lever $b$ has been pulled down far enough to bring its signal to safety the rod $b'$ will have descended far enough to carry the contact sleeve $z'$ down and beyond the contacts $z$, thus breaking the motor circuit. Thus far the two sets of electrical and mechanical appliances, the one for the danger signal, and the other for the caution signal are precisely alike in construction, arrangement and mode of operation—save that the sliding rod $b'$ of the danger signal mechanism carries on it two conducting sleeves $m'$, $n'$, insulated from each other and from the sleeve $z'$ and intended to operate, for the purposes to be presently described, in connection with contacts $m$ and $n$ respectively—these parts $m, m'$ and $n, n'$ being absent from the caution signal mechanism. Also the caution signal circuits $2^\times$, $3^\times$, are like the corresponding circuits 2, 3, of the danger signal system in function and purpose and include the same kind of electrical appliances. The caution signal primary circuit $1^\times$ however differs from the corresponding danger signal primary circuit or track circuit 1, first in that it is a grounded circuit, or a circuit including no portion of the track, and secondly in that it contains two sets of contacts $m, m'$ and $n, n'$, controlled the one by the danger signal mechanism of the same block and the other by the danger signal mechanism of the block next beyond, the arrangement being such that both danger signals must be at safety before the caution signal primary circuit is closed.

Thus each danger signal operating mechanism controls two sets of caution signal contacts, the one set $m, m'$ pertaining to the caution signal primary circuit of the same block, the other set pertaining to the caution signal primary circuit of the next block in rear, as will be clearly understood by reference to Figs. 5 and 8. It will there be seen that by the time the danger signal is lowered to safety the rod $b'$ will be caused to descend far enough to close both sets of contacts $m$, $m'$ and $n, n'$ while at the same time or an instant before the contact sleeve $z'$ passes from between contacts $z$, thus opening the danger signal motor circuit. The momentum of the armature of the danger signal motor, after the motor circuit is opened, will suffice to carry down the rod $b'$ still farther in order to insure the break at $z$ in the motor circuit, as well as complete closure at $m$ and $n$.

With this explanation the operation of the automatic block system of danger and caution signals illustrated diagrammatically in Fig. 4 will be readily understood. I have there represented three blocks $X'$, $X^2$, $X^3$, each with a system of appliances and circuits such as described with reference to Figs. 5–8, and the train Y is supposed to be on the farthest block in advance, $X^3$, moving in the direction of the arrow. Under these conditions the signals will stand as shown. In other words the clearing of blocks $X'$, $X^2$, has brought the danger signal of each one of these blocks to safety, thus closing the primary circuit $1^\times$ of the caution signal of block $X'$ through the contacts $m$ of that block and the contacts $n$ of block $X^2$. Consequently the caution signal of block $X'$ is also at safety. But the caution signal of block $X^2$ is still at danger because while the contacts $m$ of its primary circuit are closed by bringing the danger signal of block $X^2$ to safety, the contacts $n$ of said circuit, which are controlled by the danger signal mechanism of block $X^3$ are still open, this being due to the fact that the train is on block $X^3$ and the danger signal of the latter block is consequently at danger. As soon as the train clears block $X^3$, and not until then, the caution signal of block $X^2$ will be brought to safety, and so on.

In case it should not be desired to break the motor circuit immediately after the motor has done its work, then the contacts $z$, the locking and releasing circuit 3, and the electro-magnetically controlled detent would be dispensed with, and the motor circuit 2 would be similar to that shown in Figs. 1 and 2.

In conclusion I state that I do not limit myself strictly to the particular construction and arrangement hereinbefore described of the mechanism employed in carrying out my invention. It may also be observed that in lieu of the electric motor represented I may use other known and suitable form of electro-magnetic motor, actuated or controlled as hereinbefore described through the agency of the motor circuit 2 and having its moving part connected by suitable intermediaries with the signal.

What therefore I claim herein as new and of my own invention is—

1. In an automatic railway block system of danger and caution signals, the combination with a series of blocks, each having a danger signal normally at safety, and danger signal operating mechanism controlled from a track circuit to bring the signal to danger so long as a train is on the block, of a caution signal for each block, operating appliances therefor, and a primary caution signal circuit for controlling the action of said appliances, separate and distinct from the track and track circuit, and completed through two sets of contacts, controlled the one by the danger signal mechanism of the same block and the other by the danger signal mechanism of the block next in advance, substantially as and for the purposes hereinbefore set forth.

2. An automatic railway block system of danger and caution signals comprising for each block a danger signal, a track circuit therefor, a relay included in the track circuit, a motor circuit completed through contacts controlled by the track relay, and including an electric motor connected to and adapted to operate the danger signal, in combination with a caution signal, a primary circuit therefor, separate and distinct from the track and track circuit, including a relay and completed through two sets of contacts controlled the one by the danger signal mechanism of the same block, the other by the danger signal mechanism of the next block in advance, and a motor circuit completed through contacts controlled by the relay in said primary circuit, and including an electric motor connected to and adapted to operate the caution signal, substantially in the manner and for the purposes hereinbefore set forth.

3. The combination of a railway signal, and operating mechanism therefor; a primary circuit; a relay included in said circuit; a locking and releasing circuit completed through contacts controlled by the primary circuit relay, and including an electro-magnet; a detent for engaging the signal operating mechanism controlled by said electro-magnet; a motor circuit completed through two sets of contacts controlled the one by the relay of the primary circuit and the other by or from the signal operating mechanism; and an electric motor included in said motor circuit, and connected to the signal operating mechanism—the combination being and acting substantially as hereinbefore set forth.

4. The combination of a railway signal, and operating mechanism therefor; a primary circuit and a relay included in said circuit, a motor circuit completed through two sets of contacts controlled the one by the relay of the primary circuit and the other by or from the signal operating mechanism; and an electric motor included in said motor circuit and connected to the signal operating mechanism, substantially as and for the purposes hereinbefore set forth.

5. The grounded primary circuit $1^x$ of the caution signal, completed through two sets of contacts $m$, $m'$ and $n$, $n'$, of which the movable member of one is connected to and operated by the danger signal mechanism of the same block to which the caution signal of that circuit pertains, and the movable member of the other similarly is connected to and operated by the danger signal mechanism of the block next in advance, substantially as set forth.

In testimony whereof I affix my signature in presence of two witnesses.

JACOB WILLIAM LATTIG.

Witnesses:
ISAAC OTT,
W. G. ZULICK.